(12) United States Patent
Lee et al.

(10) Patent No.: US 10,524,276 B2
(45) Date of Patent: Dec. 31, 2019

(54) METHOD FOR ALLOCATING TRANSFER TIMES IN A WIRELESS POWERED COMMUNICATION NETWORK

(71) Applicant: KOREA UNIVERSITY RESEARCH AND BUSINESS FOUNDATION, Seoul (KR)

(72) Inventors: Inkyu Lee, Seoul (KR); Jihwan Moon, Yongin-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/040,897

(22) Filed: Jul. 20, 2018

(65) Prior Publication Data

US 2019/0159222 A1 May 23, 2019

(30) Foreign Application Priority Data

Nov. 23, 2017 (KR) .......................... 10-2017-0157179

(51) Int. Cl.
*H04W 72/12* (2009.01)
*H04B 7/0417* (2017.01)
*H04W 52/34* (2009.01)
*H04B 7/0426* (2017.01)
*H04B 7/06* (2006.01)

(52) U.S. Cl.
CPC ...... *H04W 72/1205* (2013.01); *H04B 7/0417* (2013.01); *H04B 7/0443* (2013.01); *H04B 7/0626* (2013.01); *H04W 52/34* (2013.01)

(58) Field of Classification Search
CPC .............. H04W 72/1205; H04W 52/34; H04B 5/0037; H04B 7/0417; H04B 7/0443; H04B 7/0626; H02J 50/20
See application file for complete search history.

(56) References Cited

U.S. PATENT DOCUMENTS

| | | | |
|---|---|---|---|
| 5,287,384 A * | 2/1994 | Avery | H04B 1/713 375/134 |
| 9,722,646 B1 * | 8/2017 | Matthews | H04B 1/0475 |
| 9,831,899 B1 * | 11/2017 | Boghrat | H04B 1/0475 |
| 2003/0123401 A1 * | 7/2003 | Dean | H04B 7/15535 370/318 |
| 2004/0232277 A1 * | 11/2004 | Gehlot | F41G 7/346 244/3.19 |
| 2016/0105840 A1 * | 4/2016 | Smiley | H04W 48/04 455/418 |
| 2016/0219506 A1 * | 7/2016 | Pratt | H04W 52/0209 |
| 2016/0234356 A1 * | 8/2016 | Thomas | H05K 9/0069 |
| 2017/0324484 A1 * | 11/2017 | Saada | H04B 1/1027 |
| 2018/0069650 A1 * | 3/2018 | Tran | H04K 3/822 |

* cited by examiner

*Primary Examiner* — Kevin D Mew
(74) *Attorney, Agent, or Firm* — NSIP Law

(57) ABSTRACT

The present invention relates to a method for allocating transfer times of a low degree of complexity for improving physical-layer security in a wireless powered communication network. A method for allocating transfer times in a wireless powered communication network according to an embodiment of the invention can provide a low-complexity method of allocating transfer times that enables physical-layer security in a secure wireless powered communication network (WPCN) using an energy harvesting jammer, and this method can be utilized to establish an energy harvesting communication system that is efficient in terms of information security.

6 Claims, 3 Drawing Sheets

METHOD FOR ALLOCATING TRANSFER TIMES IN A WIRELESS POWERED COMMUNICATION NETWORK

CROSS-REFERENCE TO RELATED APPLICATIONS

This application claims the benefit of Korean Patent Application No. 10-2017-0157179, filed with the Korean Intellectual Property Office on Nov. 23, 2017, the disclosure of which is incorporated herein by reference in its entirety.

BACKGROUND

1. Technical Field

The present invention relates to a method for allocating transfer times in a wireless power communication network, more particularly to a method for allocating transfer times of a low degree of complexity for improving physical-layer security in a wireless powered communication network.

2. Description of the Related Art

The EH communication system using radio frequency (RF) signals is currently receiving much attention among both academic and industrial groups. This technology can be greatly useful particularly in circumstances where it is difficult to supply power directly, such as in disaster situations, extreme environments, or intra-body sensor networks. Relevant prior art includes Korean Registered Patent No. 10-0920696.

In the case of a WPCN, a type of energy harvesting communication system, a hybrid access point (H-AP) may transmit an energy signal during a first energy transfer (ET) time, and the user may use the signal to perform energy harvesting (EH). During the following information transfer (IT) time, the user may transmit an information signal to the H-AP based on the harvested energy.

An energy harvesting communication network requires a short distance for energy transfer, due to the properties of RF signals, and offers a high level of utility for the Internet of Things or for small cells. In recent times, the security risks in such small-scale networks are being highlighted, and there is a growing interest in physical-layer security techniques for various EH communication systems.

Lately, there has been developed optimal time allocation technology for maximizing the amount of information transferred by the user in a wireless powered communication network (WPCN). However, the related art does not consider the possible presence of a tapper, and there is a need for a novel method for allocating time that can minimize information exposure between an H-AP and the user within a WPCN in which a tapper is present.

SUMMARY OF THE INVENTION

An objective of the invention is to provide a low-complexity method for allocating energy transfer times and information transfer times in a manner that provides physical-layer security for signals sent by a energy harvesting user to a hybrid access point (H-AP) using an energy harvesting jammer when a tapper is present in a wireless powered communication network (WPCN).

To achieve the objective above, an embodiment of the invention provides a method for allocating transfer times in a wireless powered communication network using an energy harvesting jammer, where the method includes: obtaining frequency band information; obtaining an upper limit for a secrecy rate; obtaining first channel state information representing energy transferred by a hybrid access point to a user during the energy transfer operation and second channel state information representing energy transferred by the hybrid access point to a jammer during the energy transfer operation; obtaining third channel state information representing information transferred by the user to the hybrid access point during the information transfer operation, fourth channel state information representing information transferred by the jammer to the hybrid access point during the information transfer operation, first channel distribution representing information transferred by the user to a tapper, and second channel distribution representing jamming signals transferred by the jammer to the tapper; and calculating times allocated to the energy transfer operation and the information transfer operation based on the frequency band information, the upper limit for a secrecy rate, the first channel state information, the second channel state information, the third channel state information, the fourth channel state information, the first channel distribution, and the second channel distribution such that a secrecy outage probability is minimized.

An embodiment of the invention can provide a method for allocating transfer times in a secure wireless powered communication network (WPCN) using an energy harvesting jammer, where the method has a low degree of complexity and provides security in the physical layer. This method can enable a user to establish an energy harvesting communication system that is efficient in terms of information security.

Additional aspects and advantages of the present invention will be set forth in part in the description which follows, and in part will be obvious from the description, or may be learned by practice of the invention.

DETAILED DESCRIPTION OF THE INVENTION

A method for allocating transfer times in a wireless powered communication network associated with an embodiment of the invention is described below with reference to the accompanying drawings.

In the present specification, an expression used in the singular encompasses the expression of the plural, unless it has a clearly different meaning in the context. In the present specification, terms such as "including" or "having," etc., are not to be interpreted as necessarily including all of the components or steps listed thereafter in the specification. Some of the listed components or steps may not be included, while certain other components or steps may additionally be included.

The following describes a method of a low level of complexity for allocating energy transfer (ET) and information transfer (IT) times to provide physical-layer security for signals sent by an energy harvesting (EH) user to a hybrid access point (H-AP) using an EH jammer in an environment in which a tapper is present. The communication system considered may be a wireless powered communication network (WPCN).

Figure 1:
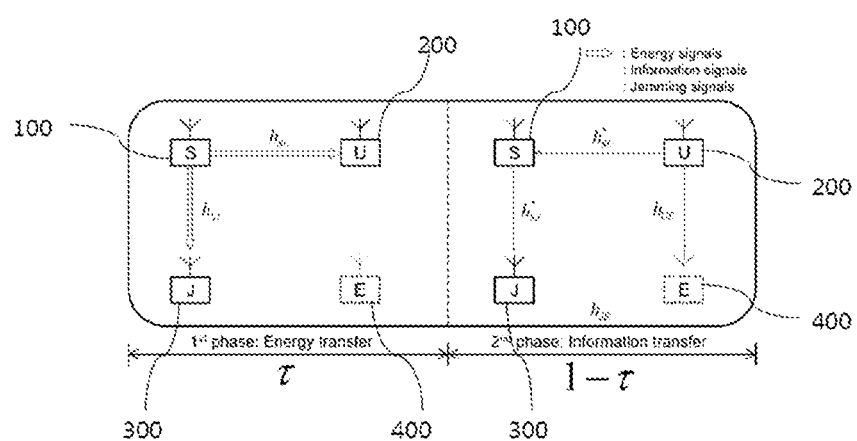
FIG. 1 illustrates an energy harvesting system for allocating transfer times in a wireless powered communication network associated with an embodiment of the invention.

FIG. 1 illustrates an energy harvesting system for allocating transfer times in a wireless powered communication network associated with an embodiment of the invention.

As illustrated in the drawing, a wireless powered communication network system can include a hybrid access point (H-AP) 100, a user 200, a jammer 300, and a tapper 400.

To begin with, during a first energy transfer (ET) time $\tau$, an H-AP 100 may transmit energy signals, and the user 200 and the jammer 300 may use the signals to perform energy harvesting (EH). Next, during an information transfer (IT) time $1-\tau$, the user 200 may transfer information signals to the H-AP 100 based on the harvested energy, and the jammer 300 may transmit jamming signals to prevent the deciphering of the information by the tapper 400. So as not to lose generality, the total communication unit time is set to 1.

The communication channel is referred to as hxy and follows a Rayleigh probability distribution, and $xy \in \{S,U,J,E\}$. Furthermore, channel reciprocity and quasi-static flat fading are supposed, and it is also supposed that the H-AP 100, the user 200, and the jammer 300 know the channel state information (CSI) between one another.

As regards the tapper 400, it is supposed that only the channel distribution information (CDI) and the physical position are detected and that the exact CSI is unknown.

During the first ET time, the signal received at the EH terminal $X_\in \in \{U,J\}$ is as expressed by Equation 1 below.

$$y_{X_\in} = \sqrt{P_S L_{SX_\in}} h_{SX_\in} x_S + n_{X_\in} \quad [\text{Equation 1}]$$

Here, $P_S$ is the transmission power of the H-AP, $L_{SX_\in}$ is the signal attenuation according to distance, $x_S \sim CN(0,1)$ is the energy signal of the H-AP, and $n_{X_\in} \sim CN(0, \sigma^2_{X_\in})$ is white noise. Here, the amount of energy that the EH terminal $X_\in$ harvests can be expressed as Equation 2 shown below.

$$\varepsilon_{X_\in} = n_{X_\in} E[|y_{X_\in}|^2]\tau = n_{X_\in} L_{SX_\in} P_S x|h_{SX_\in}|^2 \tau \quad [\text{Equation 2}]$$

Here, $n_{X_\in} \in (0,1]$ represents the energy harvesting (EH) efficiency.

The signal transferred by the user 200 to the H-AP 100 based on the harvested energy during the following IT time is $x_U \sim CN(0,1)$, and the jamming signal transferred by the jammer 300 is $X_J \sim CN(0,1)$. Here, the signal received at the H-AP 100 and the tapper 400 can be expressed as Equation 3 shown below.

$$y_{X_f} = \sqrt{L_{UX_f}} h_{UX_f} \sqrt{P_U} x_u + \sqrt{L_{JX_f}} h_{JX_f} h_{JX_f} \sqrt{P_X} x_f + n_{X_f} \quad [\text{Equation 3}]$$

Here, $X_f \in \{S,E\}$, and $P_{X_\in} = \zeta_{X_\in} \varepsilon_{X_\in}/(1-\tau)$ represents the transmission power of $X_\in$, while $\zeta_{X_\in}$ represents the proportion of power used in actual transmission from among the harvested energy.

It is supposed that the H-AP 100 and the jammer 300 cooperate with each other. That is, it is supposed that the sets of jamming signals generated by the jammer 300 and the order in which they are generated are already known to the H-AP 100, so that the H-AP 100 is able to completely cancel out the jamming signals from the received signals.

In this case, the signal-to-interference-plus-noise ratio (SINR) can be expressed as Equation 4 shown below.

$$SINR_S = \frac{|h_{SU}|^2 P_U L_{SU}}{\sigma_S^2} = \frac{\tau}{1-\tau} A \quad [\text{Equation 4}]$$

$$SINR_E = \frac{|h_{UE}|^2 P_U L_{UE}}{|h_{JE}|^2 P_J L_{JE} + \sigma_E^2} = \frac{\tau B |h_{UE}|^2}{\tau(C|h_{JE}|^2 - 1) + 1}$$

Here, $A \triangleq \zeta_S \eta_S |h_{SU}|^4 P_S L_{SU}^2/\sigma_S^2$, $B \triangleq \zeta_U \eta_U |h_{SU}|^2 P_S L_{SU} L_{UE}/\sigma_E^2$, and $C \triangleq \zeta_J \eta_J |h_{SJ}|^2 P_S L_{SJ} L_{JE}/\sigma_E^2$. Also, $\sigma_S^2$ represents the variance for the noise of the H-AP 100, and $\sigma_E^2$ represents the variance for the noise of the tapper 400.

Based on the above, the transmission amount can be expressed as Equation 5.

$$r_0 = [W(1-\tau)(\log_2(1+SINR_S) - \log_2(1+SINR_{E_m}))] \quad [\text{Equation 5}]$$

Here, W refers to the frequency band.

The problem to be resolved in this embodiment of the invention is the problem of minimizing the following secrecy outage probability, to provide physical-layer security for information between the user 200 and the H-AP 100, in a situation where only the channel distribution information (CDI) of the tapper 400 is given. This problem may be expressed as Equation 6 shown below.

$$\min_r P_{out} = Pr(r_0 \leq r_{th}) \quad [\text{Equation 6}]$$
$$\text{s.t. } 0 < \tau < 1$$

Here, $r_{th}$ is the upper limit for a secrecy rate that the system has set as a goal.

Next, a description is provided of a method of finding the secrecy outage probability and an upper limit formula for the secrecy outage probability.

First, if a mathematical expansion shows that the amount of information transfer at the H-AP 100 is greater than the upper limit $r_{th}$ or if $W(1-\tau)\log_2(1+A\tau(1-\tau)) \leq r_{th}$, then $r_0 < r_{th}$, and from the perspective of physical-layer security, security failure inevitably occurs.

On the other hand, the probability of security failure when $W(1-\tau)\log_2(1+A\tau(1-\tau)) > r_{th}$ can be expressed as Equation 7 below if the variable $s = \tau/(1-\tau)$ is substituted.

$$[\text{Equation 7}]$$

$$P_{out} = Pr\left(\log_2(1+AS) - \log_2\left(1 + \frac{B|h_{UE}|^2 s}{C|h_{JE}|^2 s + 1}\right) \leq \frac{r_{th}}{W}(1+s)\right)$$

$$= Pr(|h_{JE}|^2 \leq G(s)|h_{UE}|^2 - V(s))$$

$$= \int_{\frac{V(s)}{G(s)}}^{\infty} \int_0^{G(s)x - V(s)} e^{-x} e^{-y} dy dx = \frac{G(s)}{1 + G(s)} e^{-\frac{V(s)}{G(s)}}$$

Here, $G(s) \triangleq 2^{\frac{r_{th}}{W}(1+s)} D / (1 + As - 2^{\frac{r_{th}}{W}(1+s)})$, $$D \triangleq \frac{\zeta_U \eta_U |h_{SU}|^2 P_S L_{SU} L_{UE}}{\zeta_J \eta_J |h_{SJ}|^2 P_S L_{SJ} L_{JE}},$$

and $V(s) \triangleq 1/(Cs)$. In other words, the equation can be rewritten as Equation 8 shown below.

$$P_{out} = \begin{cases} \frac{G(s)}{1+G(s)} e^{-\frac{V(s)}{G(s)}}, & \text{if } 1 + As - 2^{\frac{r_{th}}{W}(1+s)} > 0 \\ 1, & \text{otherwise} \end{cases} \quad [\text{Equation 8}]$$

Since $P_{out}$ above is non-convex with respect to $\tau$, the procedure for obtaining an optimal solution can be obtained only by way of a one-dimensional exhaustive search and thus requires a considerably high degree of complexity.

For an easier method of analysis, an embodiment of the invention utilizes the upper limit formula $P_{out,UB}$ of the secrecy outage probability. To be more specific, if it is supposed that the noise $\sigma_E^2$ generated at the tapper 400 is negligibly small, then the following property is obtained, which can be expressed as Equation 9.

$$P_{out} = P_{out,UB} = \begin{cases} \dfrac{G(s)}{1+G(s)}, & \text{if } 1 + As - 2^{\frac{r_{th}}{W}(1+s)} > 0 \\ 1, & \text{otherwise} \end{cases} \quad \text{[Equation 9]}$$

The problem to be resolved can thus ultimately be approximated as Equation 10 shown below.

$$(P.1): \min_s P_{out,UB} = \frac{G(s)}{1+G(s)} \quad \text{[Equation 10]}$$
$$\text{s.t. } 1 + As - 2^{\frac{r_{th}}{W}(1+s)} > 0$$

Below, a description is provided of a method of a low degree of complexity for allocating energy transfer (ET) time and information transfer (IT) time by using Equation 10.

First, since the condition expression $$1 + As - 2^{\frac{r_{th}}{W}(1+s)}$$

has a concave property with respect to s, it is known that the set of solutions that s of (P.1) can have is a convex set. Also, by using the Lambert W function $W_{L,K}(\cdot)$ for the k-th branch, the set of solutions can be expressed as $\tilde{s}_L < s < \tilde{s}_U$. The set of solutions can be expressed as Equation 11 shown below.

$$\tilde{s}_L \triangleq -\frac{W}{r_{th} \ln 2} W_{L,0}(\theta) - \frac{1}{A} \quad \text{[Equation 11]}$$
$$\tilde{s}_U \triangleq -\frac{W}{r_{th} \ln 2} W_{L,-1}(\theta) - \frac{1}{A}$$

Here, $\theta \triangleq -r_{th} \ln 2 \cdot 2^{\frac{r_{th}}{W}\left(1-\frac{1}{A}\right)} / (WA)$.

Next, $P_{out,UB}$ is a monotonically increasing function with respect to $G(s)$, and the derivative of $G(s)$ with respect to s yields Equation 12 shown below.

$$\frac{\partial G(s)}{\partial s} = \frac{D(A(r_{th} s \ln 2 - W) + r_{th} \ln 2) 2^{\frac{r_{th}}{W}(1+s)}}{W(1 + As - 2^{\frac{r_{th}}{W}(1+s)})} \quad \text{[Equation 12]}$$

The solution that minimizes $G(s)$ according to Equation 12 can be expressed Equation 13 or Equation 14 shown below.

$$s^\star = \frac{W}{r_{th} \ln 2} - \frac{1}{A} \quad \text{[Equation 13]}$$

$$\tau^\star = \frac{s^\star}{s^\star + 1} = \frac{WA - r_{th} \ln 2}{WA - (1-A)r_{th} \ln 2} \quad \text{[Equation 14]}$$

$A \triangleq \zeta_S \eta_S |h_{SU}|^2 P_S L_{SU}^2 / \sigma_S^2$, W is the frequency band, $\zeta_S$ is the proportion of power used in actual transmission from among the harvested energy, $P_S$ is the transmission power of the H-AP 100, $L_{sX_E}$ is signal attenuation according to distance, and $\sigma_S^2$ is the variance of noise of the H-AP 100.

In particular, since $\theta < 0$, and since $0 < -W_{L,0}(\theta) < 1$ and $1 < -W_{L,-1}(\theta)$, $s^\star$ becomes the optimal solution of (P.1).

Figure 2:
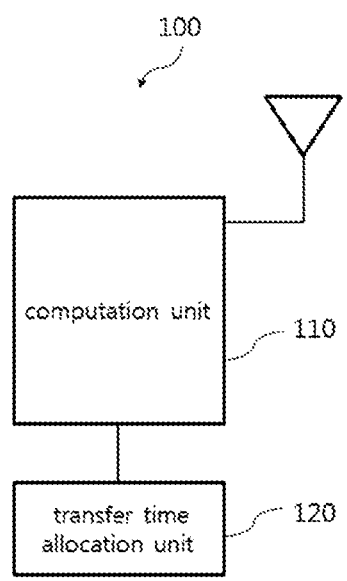
FIG. 2 is a block diagram of the hybrid access point illustrated in FIG. 1.

FIG. 2 is a block diagram of the hybrid access point illustrated in FIG. 1.

The illustrated hybrid access point 100 can include a computation unit 110 and a transfer time allocation unit 120.

The computation unit 110 can calculate the optimal energy transfer (ET) time by using Equation 13 or Equation 14, and based on the energy transfer (ET) time thus determined, can calculate the information transfer (IT) time.

The transfer time allocation unit 120 can allocate the optimal energy transfer (ET) time and information transfer (IT) time thus calculated as the energy transfer time and information transfer time. Also, for synchronization, the allocated transfer time results can be transmitted to the user 200 and the jammer 300.

Figure 3:
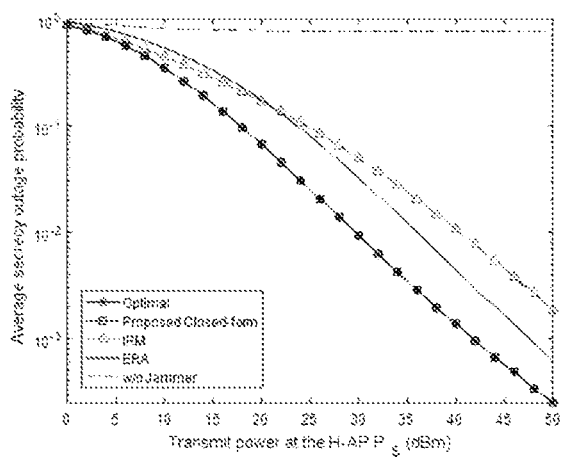
FIG. 3 is a graph showing the performance obtained by a method for allocating transfer times in a wireless powered communication network according to an embodiment of the invention compared with the performance obtained by methods of allocating transfer times according to certain other technologies.

FIG. 3 is a graph showing the performance obtained by a method for allocating transfer times in a wireless powered communication network according to an embodiment of the invention compared with the performance obtained by methods of allocating transfer times according to certain other technologies. In the graph, the performances are expressed in terms of the average secrecy outage probability. The example shown in FIG. 3 adopts the variables shown in Table 1 below.

TABLE 1

| variable | value |
| --- | --- |
| $L_{XY}$ | $10^{-3} d_{XY}^{-3}$, $\forall X, Y \in \{S, U, J, E\}$ |
| $d_{SU}$ | 6 m |
| $d_{SJ}$ | 3 m |
| $d_{UE}$ | 4 m |
| W | 1 MHz |
| $\eta_X$ | 0.5, $\forall X \in \{S, U, J, E\}$ |
| $\zeta_X$ | 0.7, $\forall X \in \{S, U, J, E\}$ |
| $\sigma_X^2$ | −160 dBm/Hz |
| $r_{th}$ | 100 kbps |

"Proposed Closed-form" represents the performance obtained when allocating the energy transfer time and information transfer time with the low degree of complexity of Equation 13 or Equation 14, "Optimal" represents the performance obtained when the calculations consider the energy transfer times of all possible cases, "ERA" represents the performance obtained when the ET and IT times are distributed equally, "IRM" represents the performance obtained according to the related art where only the amount of information transfer is maximized and the presence of tappers is ignored, and "w/o Jammer" represents the performance when times are allocated without the help of a jammer.

As can be observed from FIG. 3, the method based on an embodiment of the invention may provide the advantage of low complexity while providing virtually the same results as the "Optimal" case. It is also observable that the method based on an embodiment of the invention provides greatly superior performance compared to the other methods.

As described above, a method for allocating transfer times in a wireless powered communication network according to an embodiment of the invention can provide a low-complexity method of allocating transfer times that enables physical-layer security in a secure wireless powered communication network (WPCN) using an energy harvesting jammer, and this method can be utilized to establish an energy harvesting communication system that is efficient in terms of information security.

A method for allocating transfer times in a wireless powered communication network associated with an embodiment of the invention can be implemented in the form of program instructions that may be performed using various computer means and can be recorded in a computer-readable medium. Here, the computer-readable medium can include program instructions, data files, data structures, etc., alone or in combination. The program instructions recorded on the medium can be designed and configured specifically for the present invention or can be a type known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

The recorded medium can also be a transmission medium, such as rays, metal lines, waveguides, etc., which may include carrier waves that transfer signals for specifying program instructions, data structures, etc.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The method for allocating transfer times in a wireless powered communication network described above is not to be applied in a manner limited to the compositions and methods of the embodiments set forth above. Rather, different embodiments can be partially or wholly incorporated into a selectively combined implementation to allow numerous variations.

What is claimed is:

1. A method for allocating transfer times in a wireless powered communication network using an energy harvesting jammer, the method comprising:
   obtaining frequency band information;
   obtaining an upper limit for a secrecy rate;
   obtaining first channel state information and second channel state information relating to an energy transfer operation, the first channel state information representing energy transferred by a hybrid access point to a user during the energy transfer operation, the second channel state information representing energy transferred by the hybrid access point to a jammer during the energy transfer operation;
   obtaining third channel state information, fourth channel state information, first channel distribution, and second channel distribution relating to an information transfer operation, the third channel state information representing information transferred by the user to the hybrid access point during the information transfer operation, the fourth channel state information representing information transferred by the jammer to the hybrid access point during the information transfer operation, the first channel distribution representing information transferred by the user to a tapper, and the second channel distribution representing jamming signals transferred by the jammer to the tapper; and
   calculating times allocated to the energy transfer operation and the information transfer operation based on the frequency band information, the upper limit for a secrecy rate, the first channel state information, the second channel state information, the third channel state information, the fourth channel state information, the first channel distribution, and the second channel distribution such that a secrecy outage probability is minimized.

2. The method for allocating transfer times in a wireless powered communication network according to claim 1, further comprising:
   transferring an allocation time for the energy transfer operation and an allocation time for the information transfer operation to the user and the jammer.

3. The method for allocating transfer times in a wireless powered communication network according to claim 1, wherein the hybrid access point, the user, and the jammer share channel state information between one another, and
   channel distribution information is shared for the tapper.

4. The method for allocating transfer times in a wireless powered communication network according to claim 3, wherein the hybrid access point and the jammer cooperate.

5. The method for allocating transfer times in a wireless powered communication network according to claim 1, wherein the secrecy outage probability is calculated by Equation 1 shown below:

[Equation 1]
$$P_{out} = \begin{cases} \dfrac{G(s)}{1+G(s)} e^{-\frac{V(s)}{G(s)}}, & \text{if } 1 + A's - 2^{\frac{r_{th}}{W}(1+s)} > 0 \\ 1, & \text{otherwise} \end{cases}, \text{ where}$$

$$G(s) \triangleq 2^{\frac{r_{th}}{W}(1+s)} D \big/ (1 + As - 2^{\frac{r_{th}}{W}(1+s)}),$$

$$D \triangleq \frac{\zeta_U \eta_U |h_{SU}|^2 P_S L_{SU} L_{UE}}{\zeta_J \eta_J |h_{SJ}|^2 P_S L_{SJ} L_{JE}}, \text{ and } V(s) \triangleq 1/(Cs).$$

6. The method for allocating transfer times in a wireless powered communication network according to claim 5, wherein the calculating of the times allocated to the energy transfer operation and the information transfer operation is performed by using Equation 2 shown below:

$$\tau^\star = \frac{s^\star}{s^\star + 1} = \frac{WA - r_{th}\ln 2}{WA - (1-A)r_{th}\ln 2}, \text{ where} \quad [\text{Equation 2}]$$

$$s^\star = \frac{W}{r_{th}\ln 2} - \frac{1}{A}, \quad A \triangleq \zeta_S \eta_S |h_{SU}|^4 P_S L_{SU}^2 / \sigma_S^2,$$

W is a frequency band, $\zeta_S$ is a proportion of power used in actual transmission from among harvested energy, $P_S$ is a transmission power of the hybrid access point, $L_{s*}$ is signal attenuation according to distance, and $\sigma^2_S$ is a variance of noise of the hybrid access point.

* * * * *